(12) United States Patent
Kowalski et al.

(10) Patent No.: US 8,847,445 B2
(45) Date of Patent: Sep. 30, 2014

(54) ROTOR FOR A TURBO GENERATOR, AND TURBO GENERATOR COMPRISING A ROTOR

(75) Inventors: Waldemar Kowalski, Mülheim an der Ruhr (DE); Christoph Lehmann, Neukirchen-Vluyn (DE)

(73) Assignee: Siemens Aktiengesellschaft, Munich (DE)

(*) Notice: Subject to any disclaimer, the term of this patent is extended or adjusted under 35 U.S.C. 154(b) by 467 days.

(21) Appl. No.: 13/254,515

(22) PCT Filed: Feb. 23, 2010

(86) PCT No.: PCT/EP2010/052277
§ 371 (c)(1),
(2), (4) Date: Feb. 2, 2012

(87) PCT Pub. No.: WO2010/102900
PCT Pub. Date: Sep. 16, 2010

(65) Prior Publication Data
US 2012/0119603 A1 May 17, 2012

(30) Foreign Application Priority Data
Mar. 9, 2009 (EP) .................................... 09003400

(51) Int. Cl.
*H02K 1/32* (2006.01)
*H02K 9/00* (2006.01)
*H02K 3/24* (2006.01)
*H02K 9/08* (2006.01)

(52) U.S. Cl.
CPC .. *H02K 1/32* (2013.01); *H02K 9/08* (2013.01); *H02K 3/24* (2013.01)
USPC ................ 310/61; 310/58; 310/59; 310/60 R

(58) Field of Classification Search
CPC ................................. H02K 9/005; H02K 1/32
USPC .............................. 310/58, 59, 60 R, 61, 52
IPC ........................................................ H02K 1/32
See application file for complete search history.

(56) References Cited

U.S. PATENT DOCUMENTS 3,056,055 A * 9/1962 Willyoung et al. ............. 310/61
(Continued)

FOREIGN PATENT DOCUMENTS

| CN | 101277035 A | 10/2008 |
| CN | 101309020 A | 11/2008 |
| DE | 19732949 A1 | 2/1999 |
| EP | 1742330 A1 | 1/2007 |

(Continued)

*Primary Examiner* — Quyen Leung
*Assistant Examiner* — Thomas Truong

(57) ABSTRACT

A rotor for a turbo generator is provided. The rotor includes a cylindrical rotor shaft that expands in the center to form a rotor body, grooves introduced into the cylindrical surface of the rotor body, an excitation winding accommodated in the grooves, a feeding duct through which a cooling gas flows, and cooling ducts which penetrate the excitation winding substantially in the radial direction and connect the feeding duct to respective outlets in the cylindrical surface of the rotor body A distribution duct extending in the longitudinal direction of the shaft is arranged in the area of the central longitudinal axis. The feeding ducts are connected to the distribution duct via junction ducts. An admission duct for feeding the cooling gas is provided for each distribution duct.

14 Claims, 3 Drawing Sheets

(56) References Cited

U.S. PATENT DOCUMENTS

| | | | |
|---|---|---|---|
| 3,119,033 A | | 1/1964 | Horsley et al. |
| 3,740,596 A | * | 6/1973 | Curtis et al. ............. 310/54 |
| 4,298,812 A | * | 11/1981 | Damiron et al. ............. 310/61 |
| 4,301,386 A | * | 11/1981 | Schweder et al. ............. 310/59 |
| 2008/0252156 A1 | * | 10/2008 | Kabata et al. ............. 310/61 |

FOREIGN PATENT DOCUMENTS

| | | |
|---|---|---|
| EP | 1036997 B1 | 1/2008 |
| EP | 1964641 A1 | 9/2008 |
| EP | 1976095 A2 | 10/2008 |
| JP | 58116042 | 7/1983 |
| JP | 58116042 A | 7/1983 |

* cited by examiner

ROTOR FOR A TURBO GENERATOR, AND TURBO GENERATOR COMPRISING A ROTOR

CROSS REFERENCE TO RELATED APPLICATIONS

This application is the US National Stage of International Application No. PCT/EP2010/052277, filed Feb. 23, 2010 and claims the benefit thereof. The International Application claims the benefits of European Patent Office application No. 09003400. EP filed Mar. 9, 2009. All of the applications are incorporated by reference herein in their entirety.

FIELD OF INVENTION

The invention relates to a rotor for a turbo generator and to a turbo generator comprising a rotor of this kind.

BACKGROUND OF INVENTION

A turbo generator is known from EP 1 742 330 A1, for example. It has a drivable, rotatably mounted rotor, also referred to as a runner, and a fixed stator surrounding the rotor, also referred to as a stationary component. The rotor comprises a cylindrical rotor shaft that thickens in the center in the longitudinal direction of the shaft to form a rotor body. The rotor body is also referred to as a runner body. An excitation winding, which can be supplied with a current, is arranged on the rotor body. The stator has a stator winding. To generate electrical energy, the rotor shaft is coupled to a drive, in particular to a drive shaft of a turbine. In this way, it is possible to impart a rotary motion to the rotor relative to the fixed stator. When a current flows through the rotor, a magnetic rotary field is produced, inducing an electric current in the stator winding. Nowadays, a turbo generator has an electric power of between 100 MW and 1500 MW.

U.S. Pat. No. 3,119,033 has disclosed the practice of providing the cylindrical surface of the rotor body with grooves extending in the longitudinal direction of the shaft and spaced apart in the circumferential direction and of arranging the excitation coil in these grooves. For this purpose, a plurality of conductor bars extending in the longitudinal direction of the shaft and insulated from each other are stacked one above the other in the grooves. Toward the cylindrical surface of the rotor body, a groove-sealing key inserted into a profile is provided to secure the conductor bars against the centrifugal forces that prevail during the rotation of the rotor.

DE-B 1 036 997 has disclosed the practice of connecting the ends of conductor bars mounted in adjacent grooves to one another by way of tangential conductors extending in the circumferential direction of the shaft in order to form the excitation winding. The conductor bars are connected to the tangential conductors by soldering, in particular. The tangential conductors are mounted on a shaft neck formed between the shaft end and the shoulder of the rotor body. They form what is known as an end winding. They are secured by a rotor cap against the centrifugal forces prevailing during the rotary motion of the rotor.

As current flows through the excitation winding, a large amount of heat is produced, and this must be removed to ensure trouble-free operation and to exploit the full power potential of the turbo generator. For this purpose, the excitation winding is cooled. Thus, U.S. Pat. No. 3,119,033, which has already been cited, discloses providing some free space for a feeding duct between the bottom of each groove and the end of the excitation winding facing away from the cylindrical surface. Cooling ducts which penetrate the excitation winding and connect the feeding duct to respective outlets in the cylindrical surface of the rotor body are provided substantially in the radial direction of the rotor body. For this purpose, the conductor bars of the excitation winding are provided with apertures, bores or slots that come to lie at least partially one above the other when the conductor bars are arranged in the groove, thereby forming the continuous cooling ducts. The excitation winding is then cooled by feeding a cooling gas, generally air or hydrogen, to the feeding duct. As seen from the feeding duct, the cooling gas then flows through the cooling ducts toward the outlets thereof and, in the process, removes the waste heat produced by the excitation winding. The cooling gas heated by the waste heat flows via the outlets into the space between the rotor and the stator, which fauns a gas collecting space for the cooling gas.

DE 197 32 949 A1 has disclosed the practice of surrounding the stator and the rotor with a common gastight housing. Respective fan impellers are mounted on the two shaft ends. This shaft impeller corotates in the manner of an axial fan as the rotor rotates. In this way, the cooling gas is as it were drawn from entry points in the region of the feeding ducts, via the cooling ducts and the space between the rotor and the stator, which acts as a gas collecting space. The cooling system of the rotor is thus designed as a suction cooling system.

The larger the design of rotor, the longer are the flow paths that have to be traveled by the cooling gas in the feeding ducts and in the excitation winding. In a corresponding manner, a large rotor necessitates a suction fan with a higher power in order to deliver an appropriate quantity of cooling gas through the feeding ducts and then through the cooling ducts. However, it is not possible to arbitrarily increase the power of the fan impellers seated on the rotor shaft since it is coupled to the speed of rotation of the rotor shaft.

SUMMARY OF INVENTION

It is therefore the underlying object of the invention to improve the cooling of a rotor for a turbo generator by appropriate measures. It is a further underlying object of the invention to specify a turbo generator with a rotor of this kind.

In respect of the rotor, the object is achieved, according to the invention, by means of the combination of features in the claims. There is a realization here that a centrifugal force, the force component of which points in the direction of flow, acts on the cooling gas as it flows through the cooling ducts in the radial direction, owing to the rotary motion of the rotor. As a result, the suction effect of the suction fan is assisted by the rotary motion of the rotor. It is now proposed to arrange at least one distribution duct in the area of the central longitudinal axis of the shaft, in particular around the central longitudinal axis, said distribution duct extending substantially in the longitudinal direction of the shaft. The distribution duct is thus situated closer to the central longitudinal axis of the rotor than the feeding ducts. The distribution duct is connected to the feeding ducts by connecting ducts.

To ensure cooling of the excitation winding, the cooling gas initially flows into the distribution duct. From the distribution duct, the cooling gas flows onward via in each case at least one connecting duct to the feeding ducts assigned to the distribution duct. From there, it flows via the cooling ducts in the radial direction through the excitation winding and via the outlets into the gap between the rotor and the stator. Since the distribution duct extends closer to the central longitudinal axis than the feeding ducts, the connecting ducts extend at least partially in the radial direction. As the cooling gas flows through the connecting ducts from the distribution duct toward the feeding ducts, it is thus acted upon by a centrifugal force. This centrifugal force is added to the centrifugal force acting on the cooling gas as it flows through the cooling ducts. The centrifugal force acting on the cooling gas is thus increased. In other words, it is possible in this way to increase the action of the centrifugal force that assists the suction fan as it delivers the cooling gas. It is thus possible to deliver a larger quantity of cooling gas through the cooling ducts with an otherwise identical cooling duct geometry. In this way, it is possible to remove a larger quantity of heat from the excitation winding while retaining the geometry of the cooling ducts.

In an advantageous variant, the geometry of the cooling ducts is modified in such a way that the flow resistance thereof is increased. For this purpose, the apertures, bores or slots in the conductor bars can be arranged in such a way, for example, that they are offset slightly relative to one another in the final assembly condition of the excitation winding. As the cooling gas flows through the cooling ducts, heat transfer by convection from the walls of the cooling ducts to said cooling gas is improved. Owing to the assistance of cooling gas delivery by the additional centrifugal force, a sufficient quantity of cooling gas can be delivered through the cooling ducts, despite the higher flow resistance.

Thus, in both cases, an improved cooling effect is achieved. In this way, a sufficient cooling effect can be achieved, particularly in the case of a large rotor of a turbo generator with a high electric power. Thus, there is no longer a risk that the excitation winding will overheat, even in a turbo generator of this kind.

The cooling gas is expediently fed in via at least one admission duct, which connects the distribution duct to the outside of the shaft.

The connecting ducts expediently extend in a purely radial direction. As a result, the friction of the cooling gas with respect to the walls of the connecting ducts is minimal. Thus the maximum possible centrifugal force acts on the cooling gas as it flows through the connecting ducts. It is thus possible to achieve a particularly high cooling gas delivery rate through the cooling ducts.

In an expedient development, the connecting ducts and the cooling ducts are in alignment with each other. In this case, each cooling duct can be assigned a connecting duct, for example. Accordingly, there is virtually no turbulence or transverse flow in the axial direction of the cooling gas in the feed ducts. Thus the maximum possible centrifugal force as it were acts on the cooling gas as it subsequently flows through the connecting ducts and the cooling ducts.

One distribution duct can be assigned jointly to a plurality of feeding ducts. However, it is expedient to provide a central distribution duct for supplying all the feeding ducts with cooling gas. The formation of a central distribution duct makes it possible to maximize the length of the connecting ducts in the radial direction. As a result, the maximum achievable centrifugal force for the diameter of the rotor body acts on the cooling gas, thus enabling a particularly good cooling effect to be achieved.

In an expedient development, the at least one admission duct extends substantially in the radial direction. In this way, it is possible to keep the flow path of the cooling gas as short as possible. This is associated with a low flow resistance.

In an expedient development, the front ends of the feeding ducts are closed. As a result, it is not possible for unwanted leakage flows of cooling gas into the region of the two end windings arranged at the ends of the rotor body to occur. The cooling gas can thus be fed to the cooling ducts without loss.

In an expedient development, an additional conductor bar for the purpose of enlarging the excitation winding is arranged in the feeding duct, being matched to the dimensions of the latter. Additional windings of the excitation winding are thus formed by connecting adjacent additional conductor bars at the ends in the region of the two end windings by means of additional tangential conductors. It is thus possible in respect of the excitation winding to achieve an increased magnetic flux with a low outlay. It is thus possible to achieve an increased electric power for the turbo generator without major structural outlay.

The additional conductor bar arranged in the feeding duct has appropriate apertures, slots or bores, which are substantially in alignment with the apertures, slots or bores of the conductor bar situated above it, with the result that the cooling ducts extend substantially from the bottom of the groove to the cylindrical surface of the rotor body.

In respect of the turbo generator, the above object is achieved, according to the invention, by the features of the claims. According to this, the turbo generator comprises a rotor as claimed in the claims.

BRIEF DESCRIPTION OF THE DRAWINGS

An illustrative embodiment of the invention is explained in greater detail below with reference to a drawing.

Of the individual figures in the drawing.

DETAILED DESCRIPTION OF INVENTION

Figure 1:
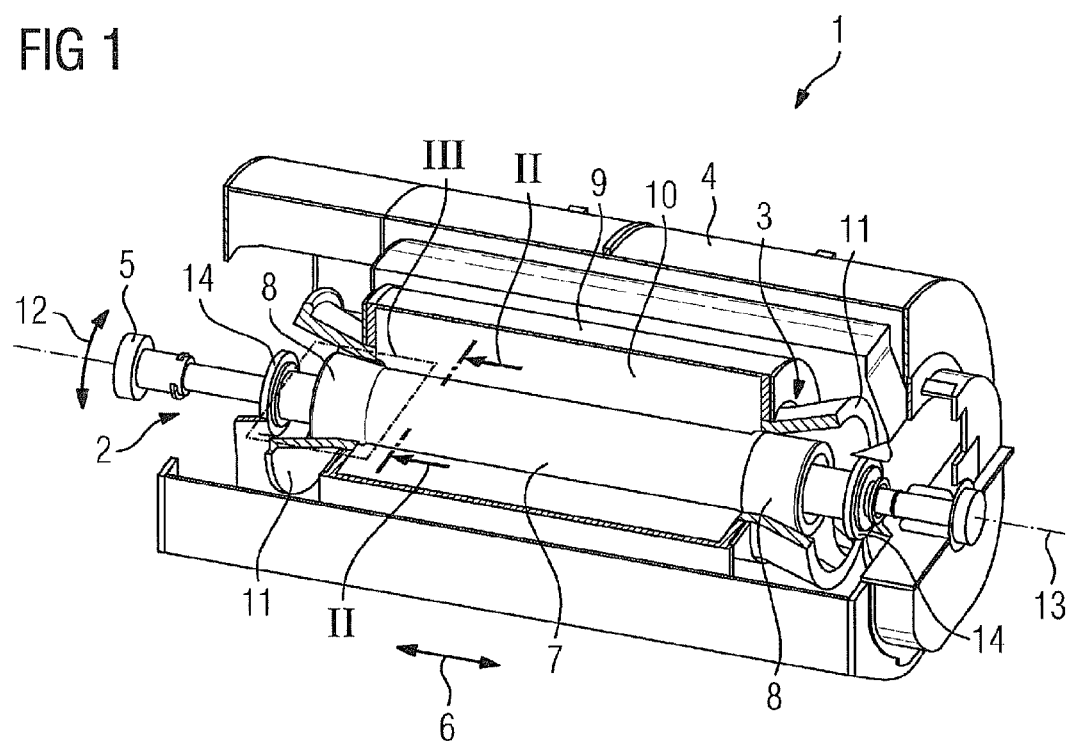
FIG. 1 shows a turbo generator having a rotor and a stator.

FIG. 1 shows a turbo generator 1 having a rotor 2 and a stator 3 accommodating the rotor. The rotor 2 is also referred to as a runner, and the stator 3 is also referred to as a stationary part or stationary component. The rotor 2 and the stator 3 are accommodated by a common gastight housing 4. The rotor 2 comprises a rotor shaft 5 that thickens in the center in the longitudinal direction 6 of the shaft to form a rotor body 7. The rotor body 7 is also referred to as a runner body or as an active component. An excitation winding (not shown in the figure) is arranged on the cylindrical surface of the rotor body 7. The two ends of the rotor body 7 as seen in the longitudinal direction 6 of the shaft each have a rotor cap 8. That section of the stator 3 which surrounds the rotor body 7 as seen in the longitudinal direction 6 of the shaft is referred to as the active component 9 of the stator or active component of the stationary part. The active component 9 of the stator has a ferromagnetic hollow body 10, in which stator conductors or stationary-part conductors (not visible) are arranged. As seen in the longitudinal direction 6 of the shaft, each of the two ends of the active component 9 of the stator is adjoined by a stator end winding 11, which is also referred to as the end winding of the stationary part.

The excitation winding of the rotor 2 can be supplied with a current. The rotor shaft 5 can be coupled to a drive shaft of a turbine (not shown) and can have a rotary motion imparted to it by the turbine. If a rotary motion is then imparted to the rotor 3 in circumferential direction 12 around the central longitudinal axis 13 of said rotor, it generates a magnetic rotating field. The central longitudinal axis 13 is thus identical with the axis of rotation. This magnetic rotating field passes through the stationary-part conductors (not shown) of the stator 3 with a variable magnetic flux. According to the law of induction, a current is thus induced in the stationary-part conductors, and this current can be picked off at the stator 3. No further details of the generation of current by the turbo generator 1 will be given.

During the operation of the turbo generator 1, the excitation winding 23 of the rotor 2 and the stationary-part conductors of the stator 9 heat up. This heating impairs the operation of the turbo generator 1. A gas cooling system is therefore provided to cool the excitation winding 23 and the stationary-part conductors. However, the only parts of the gas cooling system that can be seen in FIG. 1 are the two fan impellers 14 arranged on the shaft in positions adjoining the rotor caps 8 in the longitudinal direction 6 of the shaft. Together with the rotor shaft 5, each of the fan impellers 14 forms an axial fan. Air or hydrogen, in particular, are used as a cooling gas.

Grooves 21 that are continuous in the longitudinal direction 6 of the shaft and are spaced apart in the circumferential direction 12 are introduced into the cylindrical surface 20 of the rotor body 7. The projections between the individual grooves are referred to as rotor teeth 22. Part of the excitation winding 23 is accommodated in each groove 21. The excitation winding 23 is formed by conductor bars 24 arranged one above the other in the radial direction R of the rotor body 7 and extending in the longitudinal direction 6 of the shaft. The conductor bars 24 are insulated from each other and from the rotor body 7 by insulation 25.

Toward the cylindrical surface 20 of the rotor body 7, mutually opposite profiles 26 are provided on the inner walls of the groove 21 or on mutually adjacent rotor teeth 22 enclosing the groove 21. A groove-sealing key 27 is inserted into these profiles 26. During the operation of the rotor 2, the groove-sealing key 27 secures the excitation winding 23 against centrifugal forces.

Some free space for a feeding duct 29 is provided between the bottom 28 of a groove and the end of the excitation winding 23 facing away from the cylindrical surface 20. Arranged in this feeding duct 29 is a further conductor bar 24', which is insulated relative to the conductor bar 24 situated above it in the radial direction R toward the cylindrical surface 20 and relative to the rotor body 7 by means of insulation 25. In this way, an enlargement of the winding of the rotor body 7 is achieved.

Figure 2:
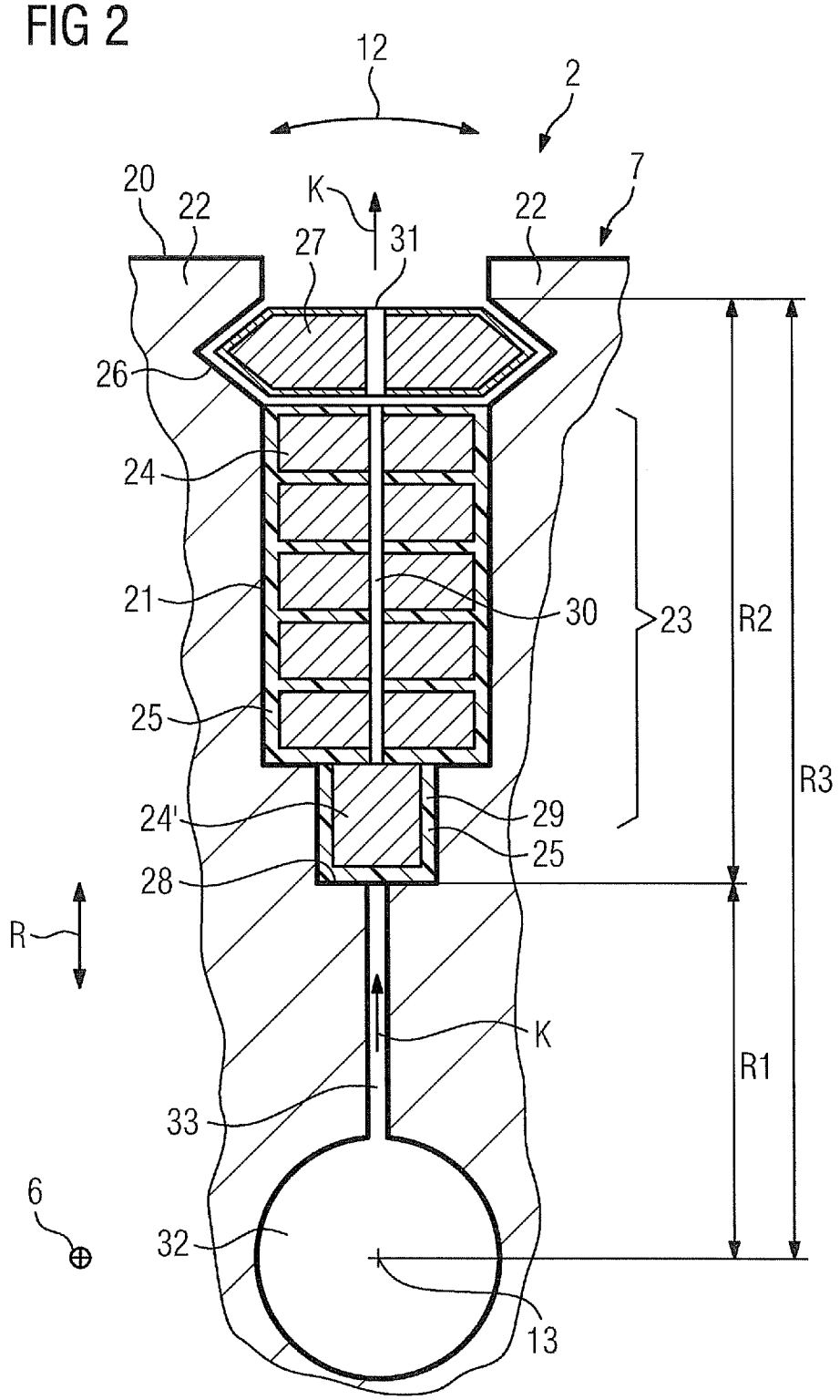
FIG. 2 shows a section comprising a section plane transverse to the longitudinal direction of the shaft through a groove and an excitation winding arranged in the groove.

Apertures are provided in the conductor bars 24, 24' and in the groove-sealing key 27, producing a continuous cooling duct 30 in the final assembly condition of the excitation winding 23. A multiplicity of such cooling ducts 30 spaced apart in the longitudinal direction 6 of the shaft and each ending in an outlet 31 toward the cylindrical surface is provided in each groove 21. A central distribution duct 32 extending in the longitudinal direction 6 of the shaft is arranged in the rotor shaft 5. In other words, the distribution duct 32 coincides with the course of the central longitudinal axis 13 of the rotor shaft 5. The distribution duct 32 has connecting ducts 33, which are spaced apart in the longitudinal direction 6 of the shaft and lead to the feeding ducts 29 of the individual grooves 22. In FIG. 2, only connecting duct 33 leading to a single feeding duct 29 is shown, for the sake of clarity.

Figure 3:
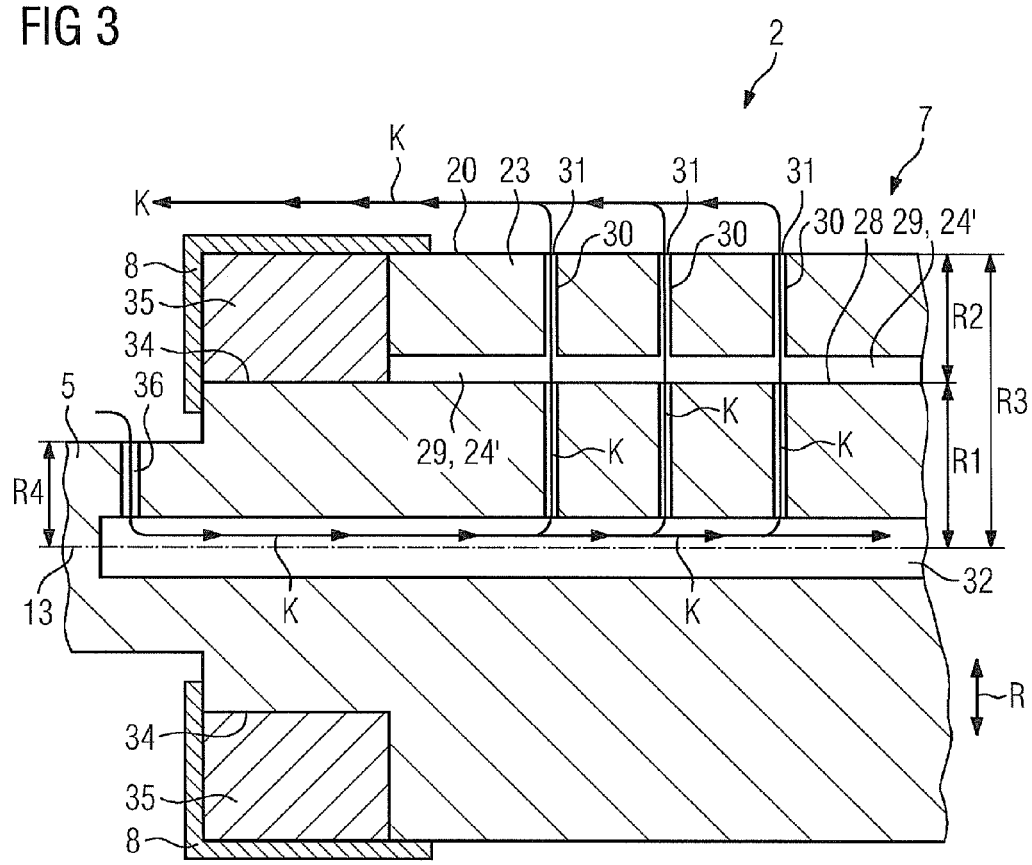
FIG. 3 shows the left hand side of the rotor from FIG. 1 in a side view sectioned in the longitudinal direction of the shaft.

FIG. 3 shows the left hand end of the shaft 5 from FIG. 1 in a sectioned side view in the longitudinal direction 6 of the shaft. The only part of the rotor body 7 that is shown, toward the left in the longitudinal direction 6 of the shaft, is the section of the rotor shaft up to the fan impeller 14, but without the latter. The section plane through the rotor body 7 is such that a groove 21 with the excitation winding 23 arranged therein is sectioned. In FIG. 3, however, the excitation winding 23 is shown only schematically. However, the cooling ducts 30 extending in the radial direction R in the excitation winding 23 are shown.

A shaft neck 34 is formed between the end of the rotor body 7 and the rotor shaft 5. This shaft neck 34 has a diameter that is between the diameter of the shaft 5 and the diameter of the rotor body 7. At the ends, conductor bars in adjacent grooves 21 are soldered to each other by way of tangential conductive connecting pieces (not shown). In this way, what is referred to as an end winding 35 is formed in the hatched area. The tangential conductors run around the shaft neck 34 in sections in the circumferential direction 12. They are secured in position against centrifugal forces by the rotor cap 8.

The distribution duct 32 runs underneath the entire rotor body 7 in the longitudinal direction 6 of the shaft. The distribution duct 32 is connected to the shaft surface of the rotor shaft 5 by a number of radial admission ducts 36. The admission ducts 36 are arranged in the radial direction R in the rotor shaft 5, in a star shape for example. Only one admission duct 36 can be seen in the section plane in FIG. 3. As the admission ducts 36 are introduced into the rotor shaft 5, care should be taken that the rotor shaft 5 is not weakened mechanically by the admission ducts 36, which are embodied as bores.

During the operation of the turbo generator 1, the excitation winding 23 of the rotor 2 heats up. For cooling, a cooling gas stream K is therefore passed through the cooling ducts 30 by means of the fan impellers 14. The cooling gas K enters the admission ducts 36. From there, it flows via the distribution duct 32 and the connecting ducts 33 to the feeding ducts 29. The feeding duct 29 distributes the cooling gas between the individual cooling ducts 30, which pass through the excitation winding 23 in the radial direction R. As the gas flows through the excitation winding 23, heat transfer by convection takes place at the walls of the cooling ducts 30. In this way, heat is removed from the excitation winding 23 or from the conductor bars 24 thereof and from the groove-sealing key 27. The cooling gas K heated by the heat released by the excitation winding 23 enters the gap between the rotor 2 and the stator 3 via the outlets 31 and flows to a cooling device, where it is subjected to cooling. The cooling gas then begins its passage through the rotor 2 again.

As it flows from the outside of the shaft 5, via the admission ducts 36, to the distribution duct 32, the cooling gas K covers section R4 in the radial direction R. As it flows from the distribution duct 32 to the feeding duct 29 via the connecting ducts 33, the cooling gas K covers section R1 in the radial direction R. As it flows through the cooling ducts 30 from the feeding duct 29 to the outlets 31 in the cylindrical surface 20, the cooling gas covers section R2 in the radial direction R. Thus, overall, there is a flow through the rotor body 7 in the radial direction R from the distribution duct 32, along section R3, which is made up of the sum of sections R1 and R2 and corresponds to the radius of the rotor body 7.

The centrifugal force acting on the cooling gas K is proportional to the distance traveled in the radial direction R. In the case of a rotor embodied in accordance with the prior art, there is a flow of gas only through section R2 of the cooling ducts 30 between the feeding ducts 29 and the outlets 31. There is accordingly a centrifugal force proportional to section R2 acting on the cooling gas K. According to FIG. 3, in contrast, the cooling gas K is now additionally acted upon by a centrifugal force proportional to the difference between sections R1 and R4. This additionally acting centrifugal force assists the flow of the cooling gas K from the inside outward in the radial direction R toward the cylindrical surface 20 of the rotor 2. It is thus possible to pass an increased volume flow of cooling gas K through the cooling ducts 30 per unit time. Good cooling of the excitation winding 23 is thus achieved.

The invention claimed is:

1. A rotor for a turbo generator, comprising:
 a cylindrical rotor shaft that thickens in a center to form a rotor body;
 a plurality of grooves that are introduced into a cylindrical surface of the rotor body and are spaced apart in a circumferential direction, and extend in a longitudinal direction of the shaft;
 an excitation winding accommodated in the plurality of grooves;
 a feeding duct, through which a cooling gas flows and for which space is provided between a bottom of a groove and an end of the excitation winding facing away from the cylindrical surface;
 a cooling duct which penetrates the excitation winding substantially in a radial direction and connects the feeding duct to a respective outlet in the cylindrical surface of the rotor body;
 a distribution duct arranged around a central longitudinal axis and extending in a longitudinal direction of the shaft;
 a respective connecting duct connecting the feeding duct to the distribution duct; and
 a radial admission duct per distribution duct for feeding the cooling gas,
 wherein the distribution duct is connected to a surface of the rotor shaft by the radial admission duct, and
 wherein a conductor bar for enlarging the excitation winding is arranged in the feeding duct, wherein the conductor bar is matched to dimensions of the feeding duct.

2. The rotor as claimed in claim 1, wherein the admission duct connects the distribution duct to an outside of the rotor shaft.

3. The rotor as claimed in claim 1, wherein the connecting duct extends in the radial direction.

4. The rotor as claimed in claim 3, wherein the connecting duct and the cooling duct are in alignment with each other.

5. The rotor as claimed in claim 1, wherein the admission duct extends substantially in the radial direction.

6. The rotor as claimed in claim 1, wherein a plurality of front ends of the plurality of grooves is closed.

7. A turbo generator, comprising:
 a drivable, rotatably mounted rotor as claimed in claim 1; and
 a fixed stator surrounding the rotor.

8. The turbo generator as claimed in claim 7, wherein a fan impeller is arranged on the rotor shaft of the rotor for the purpose of delivering cooling gas.

9. The turbo generator as claimed in claim 7, wherein a gastight housing surrounds the rotor and the stator.

10. The generator as claimed in claim 7, wherein the admission duct connects the distribution duct to an outside of the rotor shaft.

11. The turbo generator as claimed in claim 7, wherein the connect duct extends in the radial direction.

12. The turbo generator as claimed in claim 11, wherein the connecting duct and the cooling duct are in alignment with each other.

13. The turbo generator as claimed in claim 7, wherein the admission duct extends substantially in the radial direction.

14. The turbo generator as claimed in claim 7, wherein a plurality of front ends of the plurality of grooves is closed.

\* \* \* \* \*